3,136,780
VAPOR PHASE AMMONOLYSIS OF BUTYROLAC-
TONE IN THE PRESENCE OF AN ALUMINUM
SILICATE CLAY CATALYST
John M. Kolyer, Hightstown, N.J., and William B.
Tuemmler, Catonsville, and Hsiang P. Liao, Baltimore,
Md., assignors to FMC Corporation, New York, N.Y.,
a corporation of Delaware
No Drawing. Filed Dec. 12, 1961, Ser. No. 158,904
2 Claims. (Cl. 260—326.5)

This invention relates to the preparation of pyrrolidone, and more particularly, to the preparation of pyrrolidone by the vapor phase ammonolysis of butyrolactone.

Pyrrolidone is commercially prepared at the present time by the liquid phase reaction of butyrolactone with ammonia at temperatures in the range of 200–250° C. and elevated pressures for periods of 6–8 hours. Yields above about 90% are difficult to attain.

It has been suggested by Yur'ev et al., in the Journal of General Chemistry, U.S.S.R., volume 22, pp. 573–575 (1952), that pyrrolidone may be prepared in the vapor phase by passing butyrolactone and ammonia over an alumina catalyst at 350° C. However, yields of only about 16% were obtained. No process has been suggested by which pyrrolidone can be produced in high yield and at short reaction times.

It is an object of this invention to provide an economical process for the production of pyrrolidone in high yield and at short reaction times.

We have now found that pyrrolidone can be prepared in high yield and at short reaction times by reacting butyrolactone and ammonia in the vapor phase in the presence of an aluminum silicate clay catalyst at temperatures of about 200–400° C. In this manner conversions of butyrolactone to pyrrolidone of about 50%, on a once-through basis, are obtained at contact times of about 1–30 seconds, to give yields of pyrrolidone, based upon the butyrolactone conversion, in the range of about 90% and under the preferred conditions in the range of about 95–100%.

Butyrolactone is a commercially available liquid which is generally prepared by a 3-step process involving the reaction of acetylene with formaldehyde to produce 2-butyne-1,4-diol. The unsaturated dialcohol is then reduced to 1,4-butanediol, which is catalytically dehydrogenated to butyrolactone.

The ammonolysis of butyrolactone is illustrated by the following equation:

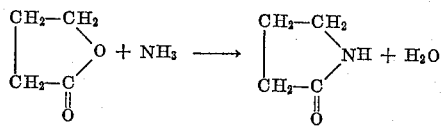

The reaction is suitably carried out by passing butyrolactone and ammonia vapors through a heated reactor packed with an aluminum silicate clay catalyst. The reactor may be any suitable vessel such as a vertical or horizontal column. Butyrolactone is vaporized by any convenient means such as passing the liquid into a preheater such as a pebble heater. The butyrolactone vapors are then passed concurrently with a stream of ammonia gas through the catalyst bed in any desired direction.

Any of the commercially available aluminum silicate clays may be used as the catalyst in this process. Suitable catalysts include clays such as bentonite, montmorillonite, kaolin and fuller's earth, and synthetic aluminum silicates prepared by sintering a mixture of alumina and silica, as well as others. The preferred catalyst is montmorillonite clay. The clay catalyst may be in the form of spheres, granules, pellets, chips, flakes, sticks, etc. The ammonia should be present in at least a stoichiometric amount; that is, 1 mole for each mole of butyrolactone. For best results, a stoichiometric excess of ammonia should be used. There is no advantage in using more than about 10 moles of ammonia per mole of butyrolactone, although larger amounts may be used, if desired. Preferably, about 2–3 moles of ammonia are present for each mole of butyrolactone.

The ammonolysis reaction is carried out at temperatures of at least about 200° C., the approximate boiling point of butyrolactone. A suitable temperature range is about 200–400° C., although higher temperatures may be used, if desired. The preferred temperatures are in the range of about 250–350° C. At temperatures below about 250° C., the reaction is somewhat slow, and longer reaction times are required. When operating at temperatures in excess of about 350° C., conversions are quite high, however significant quantities of by-products are formed. At temperatures above about 400° C., the amount of by-product formation becomes substantial.

The reaction is conducted at relatively short contact times of at least about 1 second. The contact time will generally vary inversely with the reaction temperature. For example, contact times as short as 1 second can be used with temperatures of about 400° C., and actually very short contact times are preferred at this temperature to avoid excessive by-product formation. At temperatures of about 200° C., contact times as high as about 30 seconds may be used. When operating at temperatures of 250–350° C., contact times of about 5–15 seconds are preferred. The contact time is measured as the volume of the voids in the catalyst bed, divided by the rate of flow of the reactants.

The vaporous reaction product issuing from the reactor contains a mixture of pyrrolidone, butyrolactone, γ-hydroxybutyramide, ammonia and water. The vapors are condensed and the ammonia is allowed to escape. The liquid product is then heated for a period of time sufficient to decompose the γ-hydroxybutyramide which is formed during the reaction. Preferably, the heating is carried out by refluxing for about 12 hours to completely decompose the γ-hydroxybutyramide to butyrolactone and ammonia. The crude product mixture is distilled to remove the ammonia and water, and the unreacted butyrolactone is removed by rectification. Pyrrolidone having a purity of over 99% is readily obtained in this manner.

The following examples, illustrating the novel method disclosed herein for preparing pyrrolidone, are presented without any intention that the invention be limited thereto. All parts and percentages are by weight.

*Example 1*

Butyrolactone was metered at the rate of 88 parts per min. into a glass bead preheater at 300° C. The butyrolactone vapors passing out of the preheater were swept by 42.5 parts per min. of ammonia at atmospheric pressure down through a vertical column reactor packed with montmorillonite (an acid-washed clay having the formula $(Mg, Ca)O \cdot Al_2O_3 \cdot 5SiO_2 \cdot nH_2O$) spheres. The reactor was heated to 300° C., measured by a thermocouple extending into the center of the catalyst bed. The contact time between the reactants and catalyst was 6.6 sec. The run lasted 1 hr. The reaction product was condensed and excess ammonia was allowed to escape. The liquid product was refluxed for 12 hrs. to decompose γ-hydroxybutyramide, distilled at atmospheric pressure to remove water and ammonia, and rectified at 20 mm. Hg. The pyrrolidone fraction was analyzed by vapor phase chromatography and found to contain 99% of the theoretical amount of pyrrolidone.

*Examples 2–6*

Additional examples were carried out following the procedure of Example 1, except for the variations set forth in the table. In Example 2 the catalyst was kaolin, a white clay having the formula $Al_2O_3 \cdot 2SiO_2 \cdot 2H_2O$. The catalyst used in Example 6 was obtained by reusing the catalyst from Example 5 without any treatment.

The following table presents the data for Examples 1–6.

| Example | Catalyst | NH₃/feed, mole ratio | Temp., °C. | Contact time, sec. | Duration of run, hr. | Butyrolactone converted, percent | Pyrrolidone yield, percent of theory based on conversion |
|---|---|---|---|---|---|---|---|
| 1 | Montmorillonite | 2.5 | 300 | 6.6 | 1 | 59 | 99 |
| 2 | Kaolin | 2.7 | 300 | 11.5 | 1 | 45 | 96 |
| 3 | Montmorillonite | 2.6 | 350 | 6.6 | 1 | 72 | 96 |
| 4 | do | 2.6 | 380 | 6.3 | 1 | 64 | 86 |
| 5 | do | 1.5 | 300 | 9.0 | 4 | 48 | 93 |
| 6 | Montmorillonite recycled from 5 | 2.9 | 300 | 14.0 | 6.5 | 55 | 93 |

As will be apparent to those skilled in the art, numerous modifications and variations of the aluminum silicate catalysts, reactant ratios, temperatures and contact times illustrated above may be made without departing from the spirit of this invention or the scope of the following claims.

We claim:

1. In the process of preparing pyrrolidone by the vapor phase reaction of butyrolactone and ammonia, the improvement which comprises conducting the reaction in the presence of an aluminum silicate clay catalyst at temperatures of 200–400° C.

2. The improvement of claim 1 in which the reaction is conducted in the presence of montmorillonite clay at a temperature of 250–350° C.

References Cited in the file of this patent

UNITED STATES PATENTS 2,267,757      Schuster et al. _____ Dec. 30, 1941

FOREIGN PATENTS 821,982      Great Britain _____ Oct. 14, 1959